United States Patent [19]

Feltz et al.

[11] 4,054,517

[45] * Oct. 18, 1977

[54] CHROME REMOVAL AND RECOVERY

[75] Inventors: Edward J. Feltz, Dayton; Ross Cunningham, Mount Gilead, both of Ohio

[73] Assignee: John Cunningham, Portsmouth, Ohio

[*] Notice: The portion of the term of this patent subsequent to July 13, 1993, has been disclaimed.

[21] Appl. No.: 657,885

[22] Filed: Feb. 13, 1976

Related U.S. Application Data

[63] Continuation-in-part of Ser. No. 500,606, Aug. 6, 1974, Pat. No. 3,969,246.

[51] Int. Cl.$^2$ ............................................. C02C 5/02
[52] U.S. Cl. ....................................... 210/45; 210/53; 210/DIG. 30
[58] Field of Search ................ 210/42, 45, 49, 50, 210/51, 53, DIG. 30

[56] References Cited

U.S. PATENT DOCUMENTS

| | | | |
|---|---|---|---|
| 3,371,034 | 2/1968 | Richards | 210/51 |
| 3,575,853 | 4/1971 | Gaughan et al. | 210/50 |
| 3,728,273 | 4/1973 | Bruen et al. | 210/51 |
| 3,869,386 | 2/1975 | Izdebski | 210/53 |
| 3,969,246 | 7/1976 | Feltz et al. | 210/53 |

*Primary Examiner*—Thomas G. Wyse
*Attorney, Agent, or Firm*—Biebel, French & Nauman

[57] ABSTRACT

The present invention is directed to a process for removing and optionally recovering hexavalent chromium from chromium waste water. The invention involves the use of a treatment mixture comprising the combination of barium carbonate and/or barium hydrate, plus one or more certain specified acetates. The process involves contacting the chrome waster water to be treated with the treatment mixture at an acetic pH not exceeding 6.0, and usually from 4.0 to 6.0, followed by filtration through an acid-resistant filter. The chromium removed by this filter in the form of barium chromate can be regenerated into chromic acid by backwashing the filter into an agitated tank and treating to produce chromic acid and barium sulfate. The thus-generated chromic acid can then be returned to the chrome plating tank for reuse after passing through a filter to remove the barium sulfate.

9 Claims, 2 Drawing Figures

CHROME REMOVAL AND RECOVERY

CROSS-REFERENCE TO RELATED APPLICATION

This application is a continuation-in-part of application Ser. No. 500,606, filed Aug. 6, 1974, now U.S. Pat. No. 3,969,246, issued July 13, 1976.

BACKGROUND OF THE INVENTION

This invention is directed to treatment of industrial waste waters containing hexavalent chromium in the form of chromic acid, metallic chromate salts, etc. Such chrome materials can no longer be discharged directly into sewers, rivers or streams due to various legal requirements and regulations imposed by environmental authorities. Also, chromium is an expensive metal and it is economically desirable to recover the chromium values contained in the plating and rinse tanks. A process for removing the chromium from waste water and recovering it economically and efficiently has long been desired.

Prior art methods for removing chromium from industrial waste waters containing hexavalent chromium involve reducing the pH of the chromium waste water to a highly acid condition, e.g., 2.0 to 3.0, using a strong acid such as sulfuric acid or sodium bisulfite or sulfur dioxide (by adding it to a system through an $SO_2$ feeder), while agitating the treated solution by mechanical means, or by air. Then caustic soda, lime or another basic substance is added to elevate the pH to a neutral or slightly basic condition, e.g., approximately 7.0 to 8.0, which then effects precipitation of the chrome in the trivalent form. The thus precipitated solution is then permitted to settle for four to six hours, after which water is pumped to the sewer and sludge is discarded to landfill. In many of these prior procedures, the settlement of the precipitate is accomplished with one or more clarifiers which serve to reduce the volume of the sludge for discarding at a landfill. In recent years it has become increasingly difficult to discard this sludge to landfills because the chrome material present therein tends to leach out and thus find its way back into the soil and into the streams, causing water pollution. Moreover, in addition to great difficulty in meeting current environmental protection standards, these methods are costly and comparatively inefficient.

Another prior process involves the use of ion exchange materials to remove chrome. The ion exchange procedures are extremely costly and not practical due to the large amounts of water required in such processes.

U.S. Pat. No. 3,371,034 to Richards, illustrates a direct precipitation process utilizing great quantities of barium carbonate and aqueous solutions acidifed with strong acids, such as nitric or hydrochloric acid, or their salts. Such procedures encountered difficulties in separation of the chromium solids which are precipitated from the liquid waste media, thereby necessitating the use of one or more settling tanks which can be required to handle the excessive amounts of sludge produced. Moreover, the requirement for large amounts of barium carbonate increases the amount of sludge generated.

Another prior process, set forth in U.S. Pat. No. 3,869,386 to Izdebski, provides for direct removal of hexavalent chromium by adding aqueous barium acetate thereto. Izdebski states that this precipitation can be accomplished from neutral or slightly acid solutions in cases of precipitating both chromic acid and dichromates. Disadvantages encountered with the Izdebski use of barium acetate only are that the acetate becomes more than is needed, thus having acetates in the water effluent and having to add more barium acetate to get the desire barium radical that is needed to form barium chromate. At this point barium chromate is discarded. No reuse of the chrome is contemplated by Izdebski.

Accordingly, the need exists for a total recovery system which is economical and efficient, which permits reuse of both the recovered chromium and clarified water, and which may be installed as a single treatment unit in present plating systems.

SUMMARY OF THE INVENTION

The present invention meets these needs by providing a total recovery process whereby the chrome in the waste is effectively precipitated, treated and reused, and the clarified water is either directed to the sewer or itself reused in the plating operation. Basically, the process utilizes a combination of barium carbonate and/or barium hydrate along with an acetate compound. Preferably a dry pre-mix of barium carbonate and/or barium hydrate and a powdered inorganic acetate (for example calcium acetate) is utilized.

The total additives, whether pre-mixed or not, should be used in the range from 1:1 to 6:1, additive to parts chrome in the waste water to be treated. Within the treatment mixture, the ratio of carbonate-hydrate to acetate should generally range from 3:1 to 15:1 parts by weight.

The process involves contacting the chrome waste water to be treated with the treatment mixture at an acidic pH, generally 4.0 – 6.0 followed by filtration through an acid-resistant filter. The chromium deposited on this filter in the form of barium chromate is regenerated into chromium acid by backwashing into an agitated tank where it is treated to produce chromic acid and barium sulfate. The barium sulfate is removed by a second acid-resistant filter and the chromic acid is reused in the plating operation.

The clarified water from the first filtration may itself also be reused in the plating process. It may be reused as is, may be treated with sulfuric acid first followed by filtration and neutralization, or may be disposed of as is or again after treatment with sulfuric acid and/or neutralization.

Accordingly, it is an object of the present invention to provide an efficient, economical process for recovering and reusing chromium from industrial waste solutions through the addition of barium carbonate and/or barium hydrate in mixture with an acetate material.

Another object of the present invention is to clarify chromium containing waste waters to the extent that the clarified water may also be reused in the plating process.

A further object of the invention is to provide a pre-mixed treatment composition for use in clarifying chromium containing waste waters.

Other objects and advantages of the invention will be apparent from the following description, the accompanying drawings and the appended claims.

DESCRIPTION OF THE PREFERRED EMBODIMENTS

As a result of a chromium plating process plated parts, after being removed from the plating tank(s), are placed in one or more aqueous rinse tanks. As parts are rinsed in the rinse tank(s), water counterflows backwards toward the first rinse tank for concentrated contamination. The rinse solution contained in the first rinse tank thus contains a greater concentration of chromium due to this build-up.

Figure 1:
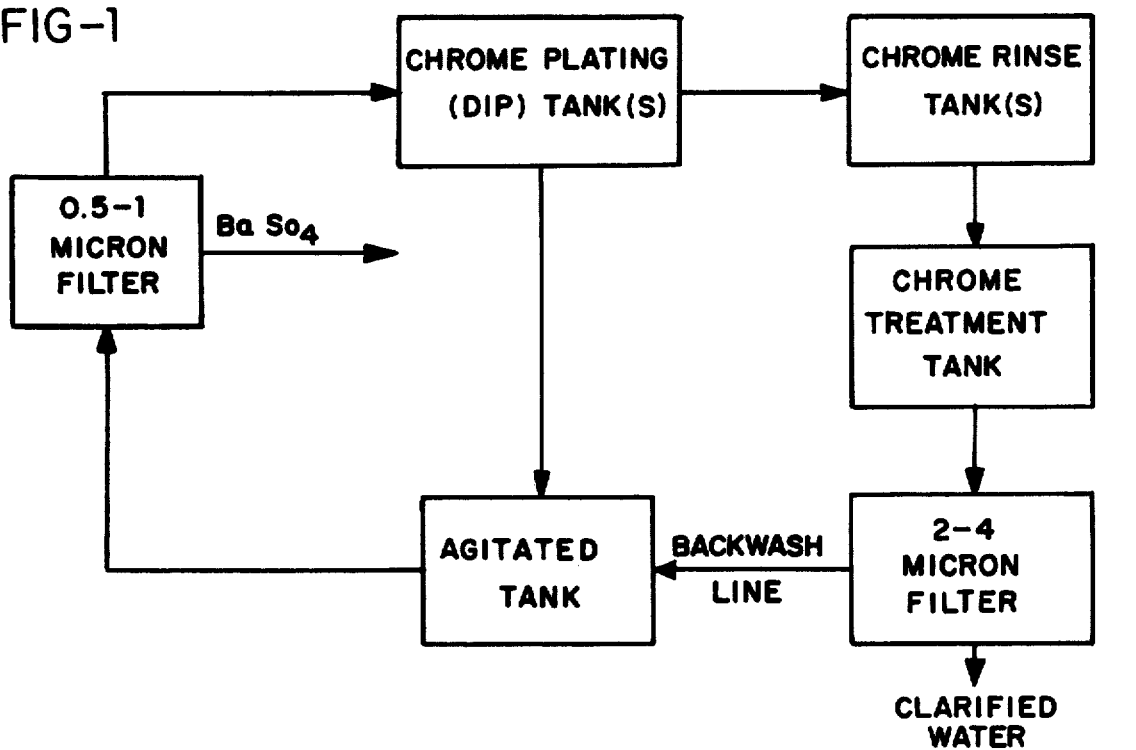
FIGS. 1 and 2 of the drawings are both flow charts showing the alternative variations in which the process may be conducted.

In accordance with the process indicated in FIG. 1, the chrome contaminated rinse water in tank 2 is removed for treatment through line 3, or by free-flow from the rinse tank to a chrome treatment tank 4. To the rinse water in this treatment tank has been added the treating composition of this invention, viz, the barium carbonate and/or barium hydrate, plus one or more specified acetates in the concentration specified herein below. The weight ratio of the barium carbonate and/or barium hydrate to the specified acetate ranges from 3 to 15 weight parts of barium carbonate and/or barium hydrate to one weight part of the specified acetate. The combination is added to the waste water in sufficient amounts to provide 1 to 6 weight parts of the combination per weight part of chrome to be removed from the waste water. The pH of the treatment tank, subsequent to the addition of the treating compositions of this invention, is acidic. Usually the pH in the treatment tank, after addition of the barium carbonate and/or barium hydrate, plus specified acetate(s), is within the range of 4.0 to 6.0, more preferably from 5.0 to 6.0. Most preferably, the weight ratio of barium carbonate and/or barium hydrate to the specified acetate(s) is around 4:1. Similarly, the preferred ratio of the treating composition to the amount of chrome present in the waste water is around 2:1.

In order to receive the benefits attainable in accordance with this invention, not only must the concentration of the barium carbonate and/or barium hydrate to the specified acetate be observed, but also it is important that the pH considerations be maintained. If the pH is permitted to exceed 6.0 during treatment, acetic acid is added in sufficient quantity to bring the pH down to 6.0 or below. If the pH of the chrome waste water, after contacting it with the treatment mixture of this invention, is below 6.0 and within the range of 4.0 to 6.0, it is not necessary to add the acetic acid.

The thus treated chrome waste water is then passed to filter 6, which is preferably a 2 to 4 micron filter, although it may vary from 0.5 to 10 microns, where the precipitated barium chromate is collected. The collected barium chromate is then removed from filter 6 by backwashing the filter through line 7 into an agitated holding tank 8. There it is treated with a sulfur containing material to produce chromic acid and barium sulfate. This may be adding sulfuric acid as disclosed in application Ser. No. 500,606 or by using the plating solution in the plating (dip) tank 1, passed to line 12, in order to lower the pH and add sulfate, thereby accelerating and enhancing conversion of the barium chromate to chromic acid at a pH ranging from 1 to 1.5. Chromic acid can then be taken from agitated tank 8 via line 9 through filter 10, a polyester filter having average openings preferably of about 0.5 to 1 micron, although it could range from 0.5 - 3 microns. The thus regenerated chromic acid can then be added to plating tank 1 by passing it through line 11. Tank 8 is usually equipped with conventional agitation equipment.

The effluent from filter 6 can be moved directly to a sewer, river or stream, or can be recycled back to the original rinse tank for reuse.

Figure 2:
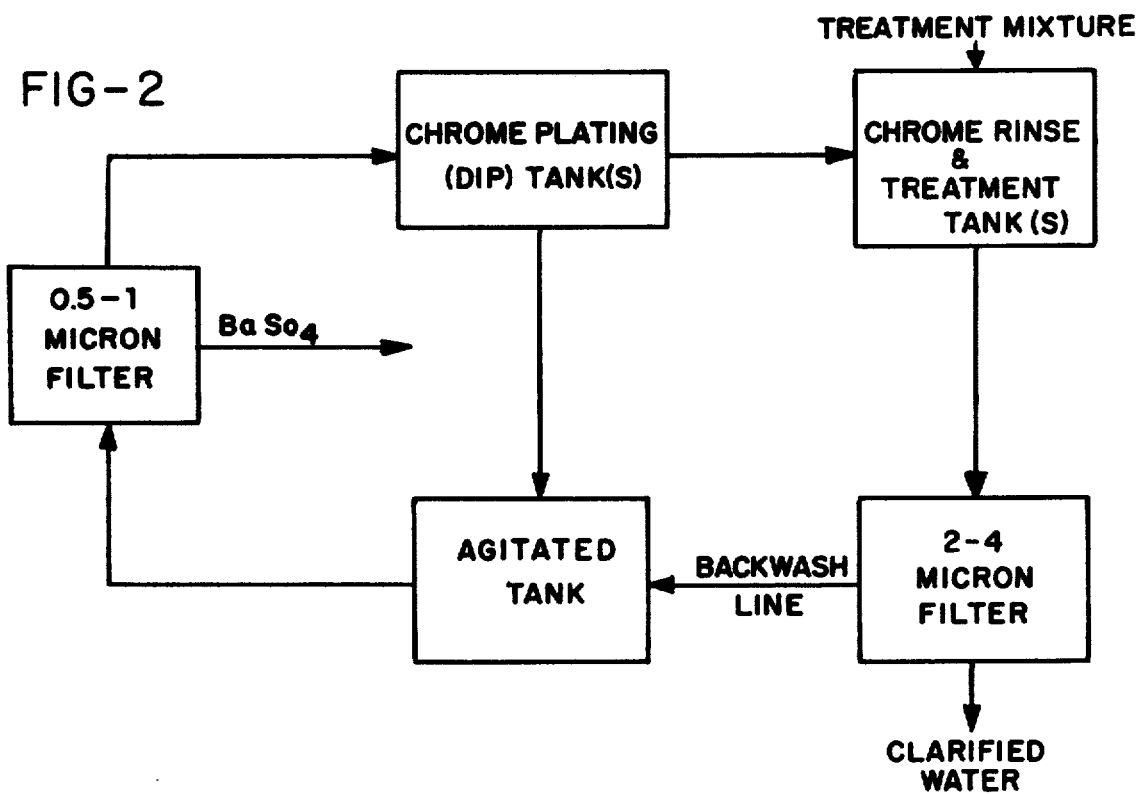

In accordance with the flow chart of FIG. 2, and rather than using a separate chrome treatment tank, the treatment mixture of this invention can be added to the chrome rinse tank 2, in which case it becomes a combined rinse and treatment tank. Otherwise, the process according to FIG. 2 is the same as illustrated in FIG. 1. Actually, the use of the FIG. 2 process is preferred since not only can the separate treatment tank and accompanying inlet and outlet lines be eliminated, but surprisingly the rinse is more effective in obtaining removal of more of the chromium from the plating operation when the rinse tank is also used as a treatment tank.

While the pH of the chrome rinse tanks and that occurring in the chrome treatment tank 4 (FIG. 1) prior to the addition of the treating composition of this invention can vary widely, the pH before addition usually is about $3.0 \pm 0.5$.

A very important aspect of the process and composition of this invention is its ability to recover the chromium, which is removed as barium chromate in a simple two step procedure involving backwashing barium chromate removed by filter 6 into an agitated tank to which there is added representative chromic acid plating solution. This plating solution contains about 100 to 200 weight parts of chromic acid per weight part of sulfate, which is typically present as sodium sulfate, sulfuric acid, etc. The volume ratio of a typical plating bath which is added to tank 8, in which the backwashed barium chromate is agitated, ranges from about 3.5 to 4.5 to 1 molar, or preferably 4 to 1 at a pH of 1 to 1.5. This chromic acid from plating tank 1 can be pumped from the plating tank directly to the agitated barium chromate-containing tank.

Thus, there is provided a chromium removal and recovery process wherein chromium is removed as barium chromate by direct precipitation using the composition of this invention in a process environment permitting its comparatively inexpensive and direct regeneration to chromic acid in a condition in which it is suitable for direct reuse in the chromic acid plating process tanks.

As previously stated, this invention involves the carefully controlled use of a combination of barium carbonate and/or barium hydrate, plus selected acetate(s) wherein the weight ratio of the combination of barium carbonate and/or barium hydrate to the selected acetate ranges from about 3 - 15 to 1, and preferably about 4 to 1. The acetate may be one or more acetates selected from the group consisting of barium acetate, calcium acetate, strontium acetate, ethyl acetate, ethylidene diacetate, ferric acetate, isobutyl acetate, isopropyl acetate, methyl acetate, aluminum acetate, stannous acetate, cerous acetate, cobalt acetate, cupric acetate, magnesium acetate, manganese acetate, nickel acetate, uranyl acetate, sodium diacetate, zinc acetate, or mixtures thereof. Acetic acid can also be used as disclosed in parent application Ser. No. 500,606. However, it is preferred that the acetate radical be in dry form so that it can be premixed with the barium carbonate and/or barium hydrate, which are also available as powders. Accordingly, the preferred acetates are those of barium, calcium, strontium, iron (ferric) aluminum, tin (stannous), cerium (cerous), cobalt, copper (cupric), magnesium, manganese, nickel, uranium (uranyl), sodium, zinc and mixtures thereof.

The acetate radical is only added to this invention composition to make the chromium solution slightly acetic and only for this result. Since metallic impurities are not affected by this procedure, and remain soluble, they flow through with the water effluent, thus eliminating the impurity return to the chrome plating solution. This leaves a pure form of chromic acid returning to the chromium plating solution.

In accordance with this invention it is important that the stated concentrations of barium carbonate and/or barium hydrate and the specified acetate be carefully observed. When the acetate(s) are employed in excess, metals will be in aqueous effluent, such metals as barium and chromium, to an unduly high extent which would prevent the direct discharge of the aqueous effluent into rivers and streams.

While the variety of acid-resistant filtering media (resistant to pH ranges of about 2 to 5) can be employed for filter 6, the use of synthetic organic plastic fibrous materials having requisite 0.5 to 10 micron openings is usually employed. Thus such synthetic organic plastic fibrous materials as polyesters, polyamides, or polyethylenes, for example "Dacron" fiber filters or equivalent are preferred. Such filters should have openings ranging from 0.5 to 10 microns, and more preferably openings within the range from 2 to 4 microns.

As stated, the removed chromium values recovered in accordance with this invention by backwashing the chrome removal filter 6 containing chromium in the form of barium chromate into an agitated holding tank 8 into which chromic acid in the form of plating bath in tank 1 is added, concentration ratio of chromic acid being 100 to 200 to 1 sulfate. The volume ratio of the plating solution to barium chromate ranges about 4 to 1, or even as high as 10 to 1, depending on the concentration of chrome plating solution. This regenerated chromic acid solution is then filtered through the 0.5 to 1 micron filter 10 leaving an insoluble barium sulfate precipitate on the filter. This precipitate can be removed from the filter by washing with water until the precipitate is clear. Alternatively, the barium sulfate filter cartridge can be discarded because barium sulfate is non-toxic and, therefore, more readily disposable.

In order to obtain intimate contact between the chromium material present in the industrial waste solution and the treating composition of this invention, it is preferable to agitate the solutions as they are combined in the chrome treatment tank 4 (FIG. 1), and chrome rinse and treatment tank(s) (FIG. 2). The reactant materials must be agitated vigorously by the use of air agitation, mechanical agitation, or any other suitable agitation procedure.

The process of this invention permits the direct precipitation, removal and recovery of substantially all of the chromium present in the waste aqueous media. The recovery procedure is substantially sludge-free and permits the removal and recovery process to be conducted without undue clogging of filters and without the necessity for using secondary or settling tanks to assist in the removal and recovery procedure. This process permits ready and swift filtration removal of chromium in one simple step. Any concentration of chromium in any volume of aqueous waste media can be removed. The chromium can be precipitated, filtered and removed without requiring considerable periods of time and additional processing apparatus, secondary holding or settling tanks. The process can be utilized in a continuous removal and recovery procedure and the chromium can be recycled for direct use to the primary industrial processes of plating.

EXAMPLE I 500 gallons of chromium rinse water containing 2 pounds of chrome was subjected to treatment in accordance with this invention. Four pounds of barium carbonate and one pound of calcium acetate (as a five pound dry pre-mix of the two) were added to the chrome rinse water and agitated vigorously for a period of approximately five minutes. The resulting chromium solution was filtered through a 2 to 4 micron filter while the same was continuously agitated. The effluent water resulting from the filtration was clear and analysis taken of chrome content was 0.001 parts per million. This is far beyond the acceptable analysis for direct discharge into rivers and streams in accordance with environmental regulations.

EXAMPLE II

The procedure of Example 1 is repeated with the added stage of regeneration of the removed chromium by backwashing the 2 to 4 micron filter with water. The backwash solution is passed to a tank in which the agitation is vigorously maintained by air. Approximately ten gallons of chromic acid from the chrome plating bath was then pumped to the agitated tank and the pH dropped to 1.5. Solution was then filtered through a 0.5 to 1 micron filter and found to be sufficiently pure to permit its direct reuse in the chrome plating process.

EXAMPLE III

The procedure of Example 1 is duplicated except utilizing four pounds of an equal (by weight) mixture of barium carbonate and/or poly hydrated barium hydrate, viz, $BaOH.H_2O$. Likewise, other acetates were substituted totally for the calcium acetate of Example 1. The results obtained were substantially the same as that of Example 1 in respect to the concentration of chrome present in the filtered solution.

While the method herein described constitutes a preferred embodiment of the invention, it is to be understood that the invention is not limited to this precise method, and that changes may be made therein without departing from the scope of the invention which is defined in the appended claims.

What is claimed is:

1. A process for removing chromium from chromium-containing water comprising contacting said chromium-containing water with barium carbonate and/or barium hydrate and a water-soluble acetate salt at a pH of 4–6 utilizing a weight concentration of barium carbonate and/or barium hydrate to chromimum present ranging from about 1 to 6 and a weight ratio of barium carbonate and/or barium hydrate to water-soluble acetate salt ranging from about 3 to 15:1, thereafter filtering the resultant insoluble chromium material with a first acid-resistant filter media, recovering the filtered chromium and removing the barium present by contacting said chromium with sulfuric acid thereby converting said chromium to chromic acid and precipitating said barium as insoluble barium sulfate, passing said effluent from said sulfuric acid contact through a second acid-resistant filter material to remove insoluble barium sulfate therefrom, collecting the effluent from said second filter, and reusing its chromium content in a chromium plating process.

2. The process as in claim 1 wherein said first acid-resistant filter media had openings within the range of 0.5 to 10 microns.

3. The process as in claim 2 wherein said second acid-resistant filter material has openings within the range of 0.5 – 1.0 microns.

4. The process as in claim 2 wherein said first acid-resistant filter media has openings of 2–4 microns.

5. The process as in claim 4 wherein said water-soluble acetate salt is selected from the group consisting of barium acetate, calcium acetate, strontium acetate, ethyl acetate, ethylidene diacetate, ferric acetate, isobutyl acetate, isopropyl acetate, methyl acetate, aluminum acetate, stannous acetate, cerous acetate, cobalt acetate, cupric acetate, magnesium acetate, manganese acetate, nickel acetate, uranyl acetate, sodium diacetate, zinc acetate, and mixtures thereof.

6. The process as in claim 5 wherein said barium carbonate and/or barium hydrate is barium carbonate and said water-soluble acetate salt is calcium acetate and wherein said barium carbonate and calcium acetate are utilized as a dry powder pre-mix.

7. The process as in claim 6 wherein said pre-mix is added directly to a chrome rinse.

8. The process as in claim 1 wherein said sulfuric acid treatment comprises contacting said filtered chromium with a plating solution.

9. The process as in claim 1 wherein said effluent from said first acid-resistant filter is also reused in said chromium plating process.

* * * * *